United States Patent [19]

Dwyer

[11] E Re. 31,125

[45] Reissued Jan. 18, 1983

[54] ARTICULATED VEHICLE STEERING SYSTEM

[75] Inventor: Robert M. Dwyer, Livonia, Mich.

[73] Assignee: Massey-Ferguson Inc., Detroit, Mich.

[21] Appl. No.: 15,513

[22] Filed: Feb. 26, 1979

Related U.S. Patent Documents

Reissue of:

[64] Patent No.: 4,081,961
Issued: Apr. 4, 1978
Appl. No.: 785,133
Filed: Apr. 6, 1977

[51] Int. Cl.[3] ..... B62D 5/08; B62D 5/10; F15B 13/06; F15B 20/00

[52] U.S. Cl. ..... 60/386; 60/402; 91/509; 137/118; 137/596.18; 180/133; 180/134; 180/139

[58] Field of Search ..... 60/384, 385, 386, 400, 60/402; 91/508, 509, 511, 454, 528, 526, 529; 180/133, 134, 139; 137/118, 596.18

[56] References Cited

U.S. PATENT DOCUMENTS

| | | | |
|---|---|---|---|
| Re. 25,036 | 9/1961 | Donner et al. | 180/133 X |
| 3,509,958 | 5/1970 | Lang | 60/402 X |
| 3,554,089 | 1/1971 | Lang | 60/425 X |
| 3,566,749 | 2/1971 | Allen et al. | 91/445 |
| 3,631,937 | 1/1972 | Joyce | 180/133 |
| 3,765,181 | 10/1973 | Lang et al. | 60/386 |
| 3,800,670 | 4/1974 | Hufeld et al. | 91/454 X |
| 4,023,363 | 5/1977 | Liebert | 60/385 |
| 4,028,997 | 6/1977 | Lang | 60/386 X |

FOREIGN PATENT DOCUMENTS

| | | |
|---|---|---|
| 1901588 | 8/1970 | Fed. Rep. of Germany . |
| 1942086 | 3/1971 | Fed. Rep. of Germany . |
| 1755033 | 7/1971 | Fed. Rep. of Germany . |
| 2035460 | 1/1972 | Fed. Rep. of Germany . |
| 2110725 | 9/1972 | Fed. Rep. of Germany . |
| 2233167 | 1/1974 | Fed. Rep. of Germany . |
| 2516771 | 10/1976 | Fed. Rep. of Germany . |
| 2535751 | 2/1977 | Fed. Rep. of Germany . |
| 1324319 | 7/1973 | United Kingdom . |

*Primary Examiner*—Irwin C. Cohen
*Attorney, Agent, or Firm*—John C. Thompson; Robert L. Farris

[57] ABSTRACT

A steering system *40* for an articulated vehicle *10* having a pair of double acting steering cylinders *24, 26* and power steering means *44* consisting of a pump *48* and a hydrostatic steering unit *50* to which the steering wheel *42* of the vehicle is interconnected. Control means *46* are disposed between the power steering means *44* and the double acting cylinders *24, 26* for causing fluid to be directed from the power steering means *44* to both of the first and second cylinders *24, 26* during rotation of the steering wheel *42* at a first steering ratio when the pump *48* is in operation, and at a second higher steering ratio when the pump *48* is not in operation to permit manual steering of the vehicle *10. The control means includes novel valving means 64 having pilot operated two position two way spool valves 84, 86 one of which 84 is operatively associated with the first double acting cylinder 24 and the other of which 86 is operatively associated with the second double acting cylinder 26.*

6 Claims, 1 Drawing Figure

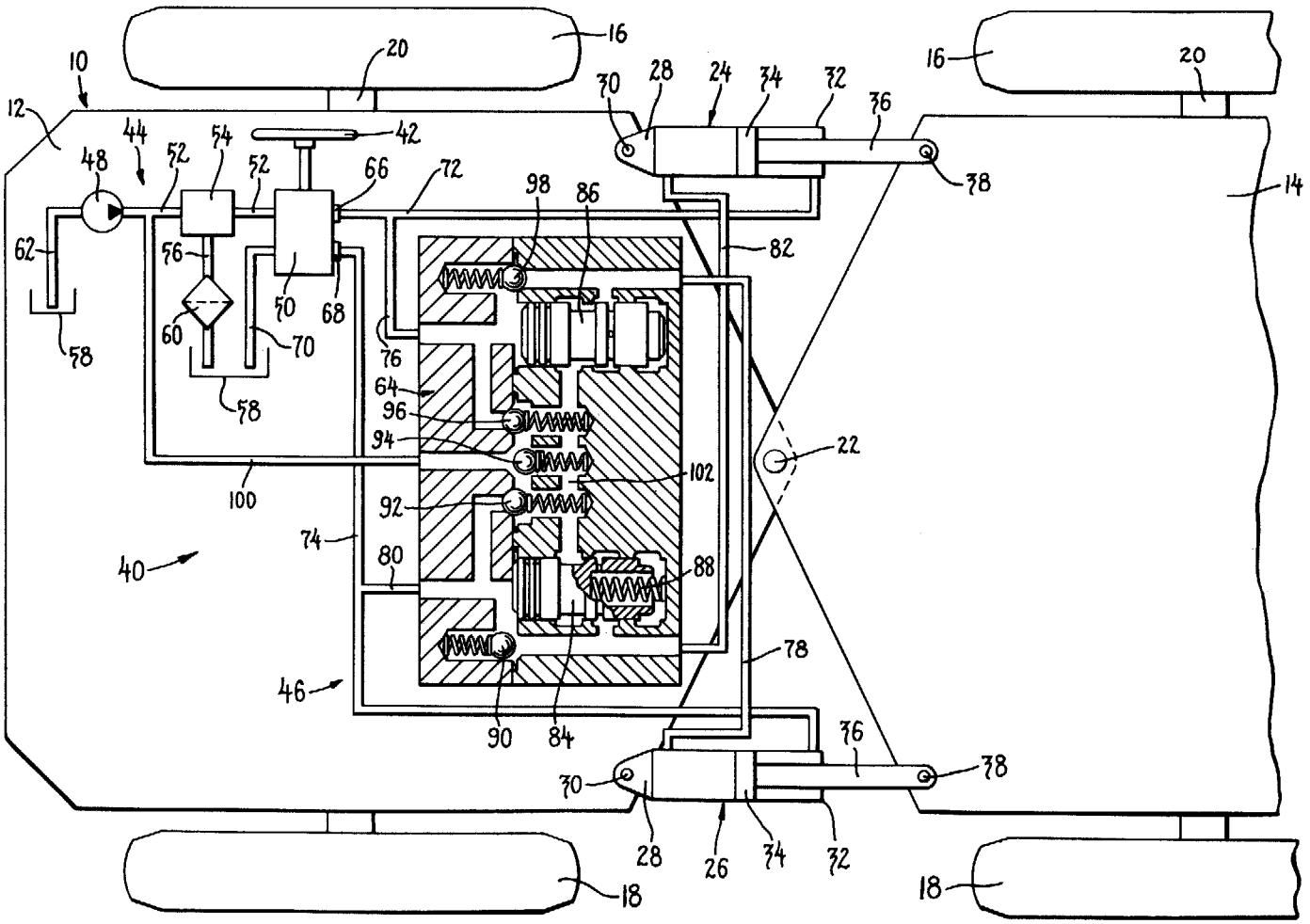
14
20
16
18
78
76
72
74
24
26
28
70
22
82
102
88
86
84
98
90
64
96
94
92
80
42
66
68
50
52
54
56
60
58
62
44
48
10
12
100
40
46

ARTICULATED VEHICLE STEERING SYSTEM

Matter enclosed in heavy brackets [ ] appears in the original patent but forms no part of this reissue specification; matter printed in italics indicates the additions made by reissue.

FIELD OF THE INVENTION

The present invention relates generally to power steering systems, and more particularly to a power steering system for an articulated vehicle which employs two double acting steering cylinders disposed on opposite sides of the pivot point of the vehicle.

BACKGROUND

Many systems have been proposed in the past for providing manual steering of a vehicle having power steering in the event that the motor driven power steering pump should fail. To this end, it has been conventional to provide the hydrostatic steering unit with a hand pump. In the event that the motor driven pump should fail, the hand pump can be utilized to introduce fluid into the power steering cylinder or cylinders. A large heavy tractor must have a high steering ratio when steering manually in order to keep the steering wheel effort low enough to satisfy the manual mode requirement if the hand pump is connected with the steering cylinders in the same manner as when the motor driven pump is in operation. In this specification, the term "steering ratio" refers to the number of turns of the steering wheel required to accomplish a certain amount of steering, the steering ratio being higher when more turns of the steering wheel are required. This high ratio is satisfactory while operating manually, but a fewer number of steering wheel turns (i.e., a lower steering ratio) is desirable while operating in the power mode.

In U.S. Pat. No. 3,765,181 issued 16 Oct., 1973 a variable ratio steering system is disclosed which will operate one steering cylinder in the power steering mode if the steering resistance is low. However, if high steering resistance is encountered both steering cylinders will be operated at a steering ratio twice as high as the single cylinder operation. In the event that the motor driven pump should fail both steering cylinders may be operated manually at the same ratio as when both cylinders are operated in the power steering mode.

In the past, a dual steering ratio has been proposed. Accordingly, a first steering ratio would be utilized all the time when operating in the power steering mode, and, a second higher steering ratio would be employed when operating in the manual steering mode. Thus, it has been suggested to use two hydrostatic steering units in parallel with a slip clutch between. In such a system both hydrostatic steering motors would be used when operating in the power steering mode and only one hydrostatic motor would be employed when operating in the manual mode. Obviously, such a system would be more costly than a system employing only a single hydrostatic steering motor and would also be somewhat inefficient due to the work lost in the slip clutch.

*U.K. Pat. No. 1,324,319 published 25 July, 1973, discloses two steering systems which provide a low steering ratio in the power steering mode and a high ratio in the manual steering mode. In FIGS. 3–5 the hydrostatic steering unit powers one cylinder during power steering while the other cylinder is powered by the pump, and during manual steering both steering cylinders are pressurized by the hand pump within the hydrostatic steering unit. The control means of this patent employs valving means including a pair of complex valve spools.*

SUMMARY OF THE INVENTION

It is an object of this invention to provide a power steering system for an articulated vehicle employing two steering cylinders, the steering system also being operable in a manual mode, which system can also overcome disadvantages of known prior art systems.

Thus, it is an object of the present invention to provide a steering system which employs only a single hydrostatic steering unit of relatively small displacement, the control means of the system directing fluid from the steering unit to one of the steering cylinders and from a motor driven pump to the other steering cylinder at all times during operation of the pump to provide for power steering at a relatively low steering ratio, and, when the pump is not in operation, to direct fluid from the steering unit to both of the steering cylinders to provide for manual steering at a relatively high steering ratio, *the control means including valving means of novel construction.*

More specifically, it is an object of the present invention to provide a steering system for an articulated vehicle, the steering system including first and second double acting steering cylinders, power steering means consisting of a pump and a hydrostatic steering unit, and control means disposed between the power steering means and the first and second steering cylinders for causing fluid to be directed from the power steering means to both the first and second steering cylinders during rotation of a steering wheel at a first steering ratio while the pump is in operation, and at a second higher steering ratio when the pump is not in operation, *the control means including valving means having pilot operated two position spool valves, one of which is operatively associated with the first double acting cylinder, and the other being operatively associated with the second double acting cylinder.*

The above objects, and other objects and advantages will be [present] *apparent* to those skilled in the art after a consideration of the following description of a preferred mode for carrying out the invention taken in conjunction with the accompanying drawings.

BRIEF DESCRIPTION OF THE DRAWING

The single FIGURE of the drawing is a somewhat schematic hydraulic diagram superimposed on a somewhat schematic illustration of a portion of an articulated tractor.

DESCRIPTION OF PREFERRED EMBODIMENT

Referring now to the FIGURE, an articulated vehicle is shown, the vehicle being indicated generally at 10. The vehicle includes a front frame 12 and a rear frame 14, only a portion of which is illustrated. The front and rear frames are each supported by right and left wheels 16, 18, respectively, the wheels being supported on fixed axles 20. A hinge pin 22 is utilized to interconnect the front and rear frames together to permit articulated steering.

As is conventional in this form of vehicle the steering is accomplished by utilizing a pair of double acting cylinders, the right cylinder being indicated generally at 24 and the left cylinder being indicated generally at 26.

As illustrated, each of the cylinders 24, 26 has an anchor or piston end 28, which is secured to the forward frame by means of a pivot pin 30 or the like, and a rod end 32. A piston 34 is mounted within each of the cylinders, the piston being connected to a piston rod 36, the rear end of which is pivotally secured to the rear frame 14 by means of a pivot pin 38.

It should be appreciated at this point that if fluid were introduced into the rod end 32 of the right cylinder 24 and/or into the anchor end 28 of the left hand cylinder 26 that a right hand turn would be accomplished. It should also be appreciated that the cylinders will be maintained in phase with each other as the two cylinders 24 and 26 are mechanically coupled together by means of the frame 12, 14 and hinge pin 22.

The steering system of this invention is indicated generally at 40 and includes, in addition to the first and second double acting cylinders 24, 26, a rotatable steering wheel 42, power steering means indicated generally at 44, and control means indicated generally at 46, the control means being operatively disposed between the power steering means 44 and the first and second double acting cylinders 24, 26. The power steering means includes a motor driven pump 48 and a hydrostatic steering unit 50. The hydrostatic steering unit is of a conventional type and includes a steering valve and a hand pump to which the steering wheel 42 is interconnected. A line 52 extends from the pump 48 to the hydrostatic steering unit 50, there being a flow divider and relief valve 54 disposed within the line 52. Extending from the flow divider and relief valve 54 is a further line 56 to reservoir 58 the further line 56 having a filter 60 disposed therein. The pump 48 is connected to reservoir 58 by intake line 62. The power steering means 44 described above can be considered for the purposes of this application to be conventional and the hydrostatic steering unit is of a non-reactive open center design.

The control means 46 is disposed between the power steering means 44 and the first and second double acting hydraulic cylinders 24, 26 and will function in such a manner as to cause fluid to be directed from the power steering means 44 to both of the cylinders 24, 26 during rotation of the steering wheel 42. The steering wheel will have a first steering ratio when the pump 48 is in operation. If the pump 48 should fail the steering cylinders 24 and 26 can still be operated by rotation of the steering wheel 42 in a manual mode, however, the control means will cause the steering ratio to be higher. The control means 46 includes a valve block or valving means 64 and various fluid lines interconnecting the steering system 44, the cylinders 24, 26, and the valving means 64.

The power steering unit 50 is provided with ports 66, 68. When a right hand turn is initiated fluid will be discharged under pressure through port 66 and will be exhausted through port 68, unit 50, and line 70 to reservoir. Alternatively, when a left hand turn is initiated, fluid will be discharged through port 68 under pressure, and exhausted oil will be returned to reservoir through port 66, unit 50 and line 70. Fluid will be directed from the hydrostatic unit 50 to the rod end of the first double acting cylinder 24 when a right hand turn is initiated through port 66 and the first fluid line 72. Alternatively fluid will be directed from the hydrostatic unit 50 to the rod end of the second double acting cylinder 26 when turning in a left hand direction through [pot] *port* 68 and the second fluid line 74. A first branch line extends from the first line 72 to the anchor end of cylinder 26, the first branch line having an upstream portion 76 to one side of the valve block 64, and a downstream portion 78 to the other side of the valve block. Similarly, a second branch line extends from the second line 74 to the anchor end of the first cylinder 24, the second branch line having an upstream portion 80 to one side of the valve block 64 and a downstream portion 82 to the other side of the valve block 64.

The valve block 64 includes first and second spool valves 84, 86, the first spool valve being operatively associated with the first cylinder 24 through line 82, and the second spool valve 86 being operatively associated with the second cylinder through line 80. Each of the spool valves is a pilot operated two position [two way] spool valve which is normally spring biased by spring 88 to a closed position, the first spool valve being shown in the [close] *closed* position. The valve block 64 also includes check valves 90, 92, 94, 96, and 98, the function of which will be explained below. The control means also includes a further fluid line 100 which extends from the line 52 to the valve block 64.

OPERATION

The FIGURE illustrates the disposition of the various parts when a right hand turn is initiated by turning the steering wheel 42 in the appropriate direction when the pump 48 is operating. At this time fluid will be directed from the hydrostatic steering unit 50 through port 66 and line 72 into the rod end 32 of the first steering cylinder 24 to cause the steering cylinder 24 to retract. Fluid from the anchor end 28 of the cylinder 24 will be exhausted through the second branch line 82, 80 the check valve 90 being forced to its open position by this flow of fluid. After the fluid leaves branch line 80 it will flow through the second fluid line 74, port 68, the steering unit 50, and through exhaust line 70 into reservoir 58. In the meantime branch line 76 will act as a pilot line causing the second spool valve 86 to be shifted from its closed position to the open position illustrated in the FIGURE. Fluid cannot flow through the check valve 96 as the fluid within line 100 is under pressure causing the check valve 94 to be unseated thereby pressurizing the chamber 102 which is associated with the check valves 92 and 96. As the spool valve 86 is shifted to its open position fluid will now flow from the pump 48 through line 100, chamber 102, spool valve 86 and line 78 to introduce fluid under pressure into the anchor end 28 of the second cylinder 26. The fluid as it passes from chamber 102 across the valve 86 will drop pressure a sufficient amount so that it will not cause the check valve 98 to be unseated. As the fluid is introduced into the anchor end 28 of cylinder 26 the cylinder will be expanded causing fluid to be exhausted from the rod end 32 through line 74, port 68, unit 50, and exhaust line 70.

It should be observed at this point that by utilizing the hydrostatic steering unit for powering only one cylinder and the pump 48 for powering the other cylinder during turning that it will be possible to employ a smaller hydrostatic steering unit than if the steering unit metered fluid from the pump to both of the cylinders 24, 26 during a power steered turn. Additionally, the cylinders 24 and 26 will be maintained in phase with each other due to their mechanical interconnection through frames 12 and 14 and pivot 22. If a left hand powered turn were being initiated the spool 86 would be closed, spool 84 would be open, check valves 92, 94 and 96 would be in the position indicated in the FIGURE, check valve 98 would be open, and check valve 90 whould be closed. The flow from the power steering unit 50 would be through line 74 with return to reservoir being through line 72. Of course, the other ends of the cylinders 24, 26 would be pressurized.

If no turn were being initiated all of the check valves and spool valves would be in their closed positions, and the fluid within the cylinders 24, 26 and control means [44] *46* would be trapped by the steering unit 50.

If the pump 48 were to fail either due to breakdown of the pump or due to a breakdown in the means for driving the pump the pressure in line 100 would drop below the pressure in chamber 102 causing the check valve 94 to be closed. During appropriate turning of the steering wheel 42 for a right hand turn [them] *the* hand pump within the power steering unit 50 would deliver fluid under pressure into line 72. Further fluid would also be directed into branch line 76 which would cause the spool valve 86 to be shifted to an open position. As no fluid is being introduced into the chamber 102 from line 100, the check valve 96 would be unseated to permit fluid from the hand pump in the power steering unit 50 to be directed into chamber 102, through the spool valve 86, and through line 78 to the anchor end 28 of the steering cyliner 26. The fluid being exhausted from the [cyliners] *cylinders* 24, 26 will go back to reservoir in the same manner as it would under a power steering turn. As the fluid displaced from the hand pump in the power steering unit 50 must now fill both the chamber in the rod end of the cylinder 24 and the chamber at the anchor end of the cylinder 26 it should be appreciated that there would be a higher steering ratio. It is a particular feature of this invention to connect the lines 72, 74, 78 and 82 to the cylinders 24 and 26 in the manner indicated to obtain the greatest variation in the steering ratio between the power mode and the manual mode. Thus, as the linear volume of the rod end of a cylinder is less than the linear volume of the anchor end of a cylinder the steering ratio will be increased by a factor greater than two.

Operation in a left hand manual mode should be apparent from the above.

What is claimed is:

[1. An articulated vehicle steering system including:

first and second double acting cylinders (24, 26) mechanically coupled together for steering an articulated vehicle (12, 14, 22);

a rotatable steering wheel (42); and power steering means (44) consisting of a motor driven pump (48) and a hydrostatic steering unit (50), said steering wheel (42) being interconnected with said hydrostatic steering unit (50);

the improvement comprising control means (46) disposed between the power steering means (44) and the first and second double acting cylinders (24, 26) for causing fluid to be directed from said power steering means (44) to both of said first and second cylinders (24, 26) during rotation of said steering wheel (42) at a first steering ratio when the motor driven pump (48) is in operation and at a second higher steering ratio when the motor driven pump (48) is not in operation.]

[2. The articulated vehicle steering system set forth in claim 1 in which the control means (46) includes valving means (64) for directing fluid from the hydrostatic steering unit (50) to the first double acting cylinder (24) when turning in a first direction and for directing fluid from the hydrostatic steering unit (50) to the second double acting cylinder (26) when turning in a second direction.]

[3. The articulated vehicle steering system set forth in claim 2 further characterized by the provision of line means (72, 74) to direct fluid from the hydrostatic steering unit (50) to the rod end (32) of either the first or second double acting cylinder (24, 26).]

[4. The articulated vehicle steering system set forth in claim 1 in which said control means (46) includes valving means (64) having first and second spool valves (84, 86), the first spool valve (84) being operatively associated with the first double acting cylinder (24), and the second spool valve (86) being operatively associated with the second double acting cylinder (26).]

[5. The articulated vehicle steering system set forth in claim 4 in which the spool valves (84, 86) will block the flow of fluid to the double acting cylinders (24, 26) from the motor driven pump (48) when the articulated vehicle is not being turned, one of the spool valves being shifted by pilot line pressure from the hydrostatic unit (50) during turning to cause fluid to be directed from the motor driven pump (48) to one of the double acting cylinders (24, 26).]

[6. The articulated vehicle steering system set forth in claim 4 in which each of said first and second spool valves (84, 86) is a pilot operated two position two way spool valve normally spring biased to a closed position.]

[7. The articulated vehicle steering system set forth in claim 6 in which the control means (46) further includes first and second fluid lines (72, 74) extending from the hydrostatic steering unit (50) to one end (32) of the first and second double acting cylinders (24, 26), respectively, a first branch line (76, 78) extending from the first line (72) through the valving means (64) to the other end (28) of the second double acting cylinder (26), and a second branch line (80, 82) extending from the second line (74) through the valving means (64) to the other end (28) of the first double acting cylinder (24), the valving means (64) further including check valves (90, 98), one check valve being in each branch line (76, 78 and 80, 82) to permit flow away from the associated double acting cylinder (24, 26).]

[8. The articulated vehicle steering system set forth in claim 6 in which both of the spool valves (84, 86) will be in their closed position when the articulated vehicle is not being turned, one of the spool valves (84, 86) being shifted to an open position be pilot line pressure from the hydrostatic steering unit (50) during turning to cause fluid to be directed from the motor driven pump (48) to one of the double acting cylinders (24, 26), the other spool valve (86, 84) remaining closed when said one spool valve (84, 86) is in its open position.]

*9. A valve (64) for a steering system of the type including a pair of oppositely acting double acting hydraulic cylinders (24,26), a motor driven pump (48), a hydrostatic steering unit (50), and a rotatable steering wheel (42), said steering wheel operating at a first steering ratio when the pump (48) is in operation and at a second higher steering ratio when the pump is not in operation, said valve (64) including:*

*a pair of independently operable pilot operated two position spool valves (84, 86) normally spring biased by spring bias means to a closed position, a pair of separate pilot line passageways each of which is in fluid communication with one of said spool valves and operable when pressurized to shift said spool valve against*

*said spring bias means to an open position, another pair of separate passageways each of which is associated with one of said spool valves and is operable to place the associated spool valve in communication with one end of one of a pair of double acting cylinders (24, 26), additional passageway means extending between said spool valves and adapted to be placed in fluid communication with a pump, and a pair of check valves (90, 98), there being one check valve between each of said pilot line passageways and one of said another pair of separate passageways, each check valve being capable of preventing flow from the associated pilot line passageway to the associated another separate passageway.*

*10. The valve set forth in claim 9 further characterized by the provision of another pair of check valves (92, 96) there being one of said another check valves disposed between each of said pair of separate pilot line passageways and said additional passageway means, each of said another check valves being capable of preventing flow from the associated additional passageway means to the associated pilot line passageway.*

*11. The valve set forth in claim 9 further characterized by the provision of further check valve means (94) in said additional passageway means, said further check valve means being capable of preventing flow back to a pump.*

*12. A valve for a steering system of the type including a pair of double acting hydraulic cylinders (24,26) mechanically coupled together in such a manner that they will act in opposite directions, a motor driven pump (48), a hydrostatic steering unit (50), and a rotatable steering wheel (42), said steering wheel operating at a first steering ratio when the pump (48) is in operation and at a second higher steering ratio when the pump is not in operation, said valve (64) including:*

*a pair of independently operable pilot operated two position spool valves (84, 86) normally spring biased by spring bias means to a closed position, a pair of separate pilot line passageways each of which is in fluid communication with one of said spool valves and operable when pressurized to shift said spool valve against said spring bias means to an open position, additional passageway means extending between one side of said spool valves and adapted to be placed in fluid communication with a pump (48), another pair of separate passageways each of which is associated with the other side of one of said spool valves, a first pair of check valves (90, 98), there being one of said first pair of check valves disposed between a pilot line passageway and one of said another pair of separate passageways, each of the first pair of check valves being capable of preventing flow from the associated pilot line passageway to the associated another separate passageway, a second pair of check valves (92, 96), each of said second pair being disposed between one of said pilot line passageways and said additional passageway means, and being capable of preventing flow from the associated additional passageway means to the associated pilot line passageway, and a fifth check valve (94) disposed in said additional passageway means upstream of said second pair of check valves and operable to prevent fluid flow in a direction towards a motor driven pump (48).*

*13. An articulated steering system including:*

*first and second double acting cylinders (24, 26) mechanically coupled together for steering an articulated vehicle (12, 14, 22);*

*a rotatable steering wheel (42); and*

*power steering means (44) consisting of a motor driven pump (48) and a hydrostatic steering unit (50), said steering wheel (42) being interconnected with said hydrostatic steering unit (50);*

*the improvement comprising*

*control means (46) disposed between the power steering means (44) and the first and second double acting cylinders (24, 26) for causing fluid to be directed from said power steering means (44) to both of said first and second cylinders (24, 26) during rotation of said steering wheel (42) at a first steering ratio when the motor driven pump (48) is in operation and at a second higher steering ratio when the motor driven pump is not in operation, said control means including valving means (64) having first and second pilot operated two position spool valves (84, 86) normally spring biased by spring bias means to a closed position, and first and second check valves (90, 98) each in parallel circuit with an associated spool valve, first line means (82) connecting the first spool valve (84) solely with one end of the first double acting cylinder (24), and second line means (78) connecting the second spool valve (86) solely with one end of the second double acting cylinder (26), first and second additional fluid lines (72, 74) extending from the hydrostatic steering unit (50) to the other end (32) of the first and second double acting cylinders (24, 26), respectively, a first branch line (76) extending from the first additional line (72) through one of the check valves (90, 98) to the second line means (78), the first additional line being in pilot communication with the associated pilot operated spool valve, and a second branch line (80) extending from the second additional line (74) through the other one of the check valves (90, 98) to the first line means (82), the second additional line being in pilot communication with the associated pilot operated spool valve, each of the check valves (90, 98) permitting flow away from the associated double acting cylinder (24, 26).*

* * * * *